United States Patent
Hayashi et al.

(10) Patent No.: US 9,328,656 B2
(45) Date of Patent: May 3, 2016

(54) ELECTRICALLY DRIVEN TURBOCHARGER DEVICE

(75) Inventors: Noriyuki Hayashi, Tokyo (JP); Yukio Yamashita, Tokyo (JP)

(73) Assignee: Mitsubishi Heavy Industries, Inc., Tokyo (JP)

( * ) Notice: Subject to any disclaimer, the term of this patent is extended or adjusted under 35 U.S.C. 154(b) by 237 days.

(21) Appl. No.: 13/384,967

(22) PCT Filed: Feb. 2, 2011

(86) PCT No.: PCT/JP2011/052103
§ 371 (c)(1),
(2), (4) Date: Jan. 27, 2012

(87) PCT Pub. No.: WO2011/114789
PCT Pub. Date: Sep. 22, 2011

(65) Prior Publication Data
US 2012/0121447 A1    May 17, 2012

(30) Foreign Application Priority Data

Mar. 18, 2010 (JP) ................................. 2010-062583

(51) Int. Cl.
*F02B 39/10* (2006.01)
*F02B 39/00* (2006.01)
(Continued)

(52) U.S. Cl.
CPC ................. *F02B 39/10* (2013.01); *F02B 37/04* (2013.01); *F02B 37/225* (2013.01); *F02B 39/005* (2013.01); *F01P 7/02* (2013.01); *Y02T 10/144* (2013.01)

(58) Field of Classification Search
CPC ...... F02B 37/04; F02B 37/225; F02B 39/005; F02B 39/10; F02B 37/10; F02B 37/02; F02D 41/0007

USPC ........ 417/366, 423.1, 423, 7, 417.14; 60/608, 60/605.1
See application file for complete search history.

(56) References Cited

U.S. PATENT DOCUMENTS 4,449,367 A * 5/1984 Moriguchi et al. ............. 60/602
6,266,956 B1 * 7/2001 Suzuki et al. ................... 60/278
(Continued)

FOREIGN PATENT DOCUMENTS

| CN | 1834456 A | 9/2006 |
|---|---|---|
| EP | 1 391 595 A1 | 2/2004 |

(Continued)

OTHER PUBLICATIONS

Machine Translation/ JP 2006-258094 A; Inventor Morita et al., "Supercharging device for internal combustion engine".*
(Continued)

*Primary Examiner* — Devon Kramer
*Assistant Examiner* — Lilya Pekarskaya
(74) *Attorney, Agent, or Firm* — Birch, Stewart, Kolasch & Birch, LLP

(57) ABSTRACT

Inside of a gas-tight housing, an electric motor, an inverter and a compressor are housed. Further, an intake air pipe is connected to the gas-tight housing. Inside of the gas-tight housing, an intake air flow passage is formed. Further, a connection opening of an outside air induction pipe provided with a flow rate regulating valve is arranged so as to face a suction opening of a compressor. When the delivery air flow rate as well as the delivery air pressure of the compressor is reduced due to the pressure loss and the like of the intake air 'a' which passes through the air flow passage and cools the electric motor and the inverter, an outside air 'o' of low temperature is induced so that: the capacity shortage as well as the performance deterioration of the compressor is constrained; and the over-heating of the compressor is constrained.

12 Claims, 7 Drawing Sheets

(51) Int. Cl.
  *F02B 37/22* (2006.01)
  *F02B 37/04* (2006.01)
  *F01P 7/02* (2006.01)

(56) References Cited

U.S. PATENT DOCUMENTS

| | | | | |
|---|---|---|---|---|
| 6,298,718 | B1 * | 10/2001 | Wang | 73/114.01 |
| 7,503,175 | B2 * | 3/2009 | Isogai | 60/607 |
| 2005/0193732 | A1 | 9/2005 | LaRue | |
| 2009/0205333 | A1 * | 8/2009 | Bielass | 60/605.1 |
| 2010/0018203 | A1 * | 1/2010 | Richards | 60/598 |
| 2010/0247343 | A1 | 9/2010 | Shimizu et al. | |

FOREIGN PATENT DOCUMENTS

| | | | |
|---|---|---|---|
| FR | 2 484 535 A1 | | 12/1981 |
| JP | 2006258094 A | * | 9/2006 |
| JP | 2006-307648 A | | 11/2006 |
| JP | 2006307648 A | * | 11/2006 |
| JP | 2008215075 A | * | 9/2008 |
| JP | 2009-041556 A | | 2/2009 |
| JP | 2006-258094 A | | 9/2009 |
| JP | 2008-215075 A | | 9/2009 |
| WO | WO 2008/020511 A1 | | 2/2008 |

OTHER PUBLICATIONS

Machine translation/JP 2006-307648 A; Inventor Kojima et al., "Electric supercharger".*
Machine translation/JP 2008-215075 A; Inventor Yamashita et al; "Cooling method and device for electric supercharger".*
Extended European Search Report issued in corresponding EP Application No. 11755979.9 on May 8, 2015.
Notification of Completion of Formalities for Registration issued on Jun. 12, 2014 in corresponding Chinese Application No. 201180002545.0.

* cited by examiner

ELECTRICALLY DRIVEN TURBOCHARGER DEVICE

BACKGROUND OF THE INVENTION

1. Field of the Invention

The present invention relates to an electrically driven turbocharger device installed into an internal combustion engine which is mounted on an automobile and the like, wherein the decreasing of the compressor capacity as well as the increase of the delivery air temperature can be constrained, while the inverter and the motor which are installed in the electrically driven turbocharger device can be cooled by the air inhaled into the electrically driven turbocharger device.

2. Background of the Invention

In the conventional internal combustion engine used for an automobile and the like, the engine is often combined with an exhaust gas turbocharger in which a turbine is driven at high speed by the exhaust gas emitted from the engine and the turbine drives a compressor via a common shaft which the turbine possesses with the compressor. Thus, in order to drive the turbocharger, the exhaust gas emitted from the internal combustion engine is necessary; however, it is difficult for the exhaust gas to quickly drive the turbocharger in starting the engine or in quickly accelerating the engine. Hence, in the electrically driven turbocharger device, the rotation of the turbocharger is performed by an electric motor or by the assistance of the electric motor. Patent Reference 1 discloses an example of the electrically driven turbocharger device. Based on FIG. 6, the electric turbocharger disclosed in Patent Reference 1 is now explained below.

In FIG. 8, an electrically driven turbocharger device 102 which is installed in an intake air flow passage 101 of an engine 100 includes, but not limited to:

a compressor 104 provided so as to face the intake air flow passage 101; an electric motor 106 driving the compressor 104;

a control device 108 controlling the electric motor 106;

a turbocharged air rate adjusting device 110 which sends an order for the turbocharged air flow rate to the a control device 108, turbocharged air rate adjusting device 110 including, but not limited to, a steering lever which a driver manually manipulates;

an indication device 112 which indicates the turbocharged air flow rate, the indication device 112 including, but not limited to, an instrument panel (not shown) placed in front of the driver seat; and a power source 114 comprising including, but not limited to, a vehicle mounted battery and an alternator.

The control device 108 is provided with a driving device section 116 driving the electric motor 106, and a control order section 118 controlling the driving device section 116 in response to the turbocharged air flow rate which is set up by the driver. The control device 108 is provided with, for instance, a built-in inverter configured with a switching element such as a FET. By means of the inverter, the electric power from the power source 114 is transformed into AC electricity; and, the rotation speed of the electric motor 106 is controlled by arbitrarily changing the electricity voltage and the electricity frequency.

The electricity storage device such as a battery which the power source 114 configures is of a comparatively low voltage type; thus, heavy-current streams in the inverter and generates a large amount of heat in the inverter. Further, the rotation speed of the electric motor 106 is high and a large amount of heat is generated. Hence, it becomes necessary to cool the inverter or the electric motor.

Patent Reference 2 discloses a cooling device which cools the inverter or the electric motor in the electrically driven turbocharger device. Based on FIG. 9, the cooling device disclosed in Patent Reference 1 is now explained below.

In FIG. 9, an intake air 'a' is inhaled from an air inlet for inhaling the air for the compressor 202 provided in the intake air flow passage 200; the air is delivered to an engine (not shown) from the compressor. The intake air flow passage 200 is configured with three branch line passages which are branched at the air inlet 204 in three ways. In other words, a series flow passage 210 starts from the air inlet 204 and reaches the inlet of the compressor, passing by heat producing parts of an inverter 206 and an electric motor 208. A second series flow passage 212 starts from the air inlet 204 and reaches the heat producing part of the electric motor 208, bypassing the inverter 206. And, the bypass flow passage 214 starts from the air inlet 204 and is connected to the an intake air flow passage 216 on the air inlet side of the compressor 202, bypassing the inverter 206 and the electric motor 208.

In addition to these three flow passages, a bypass flow passage 218 is provided so that the bypass flow passage starts from the air inlet 204 and reaches the engine inlet side of the compressor, bypassing the inverter 206, the electric motor 208 and the compressor 202. At the branch point from which the second series flow passage 212 starts, a movable valve 220 is provided; at the branch point of the bypass flow passage 214, a movable valve 222 is provided; and, at the branch point of the bypass flow passage 218, a movable valve 224 is provided. Incidentally, the bypass flow passage is used in a case where the compressor 202 is stopped; accordingly, the movable valve 224 is usually closed.

As shown in FIG. 8, when the compressor 202 is not operated, the second series flow passage 212 and the bypass flow passage 214 are shut by closing the movable valves 220 and 222. When the compressor 202 is started, the rotation speed of the compressor reaches at an idling speed of several thousands to ten thousand rpm; thereby, all the intake air 'a' inhaled through the air inlet 204 is supplied to the series flow passage 210; the intake air 'a' cools the inverter 206 and the electric motor 208.

As shown in FIG. 8, when the compressor 202 is placed under an operation condition, the rotation speed of the compressor reaches a high speed of several tens-thousands rpm to hundred-thousand and several tens-thousands rpm. Thus, the intake air flow rate increases; consequently, if all the intake air 'a' is supplied to the series flow passage 210, the pressure loss in the intake air flow becomes greater. Hence, the three flow passages, namely, the series flow passage 210, the bypass flow passages 214 and 218 are opened, and the intake air 'a' is supplied to the series flow passage 210 so that the flow speed reaches a sufficient speed which is necessary for the intake air flow to cool the inverter 206 and the electric motor 208.

REFERENCES

Patent References

Patent Reference 1: JP2006-258094
Patent Reference 2: JP2008-215075

SUMMARY OF THE INVENTION

Subjects to be Solved

According to Patent Reference 2, in order to increase the cooling efficiency of the cooling device using the intake air toward the compressor, it becomes desirable to increase the flow speed of the intake air as high as possible. On the other hand, the flow rate of the air inhaled by the compressor depends on the air flow rate which the engine requires; thus, the flow rate of the air inhaled by the compressor cannot deviate from the air flow rate which the engine requires. Therefore, in order to increase the flow speed of the intake air, it is taken into consideration to decrease the section area of the intake air flow passage. However, if the intake air flow passage is made narrow, the pressure loss is increased so that the flow rate of the air inhaled by the compressor as well as delivered by the compressor is decreased. Accordingly, there arises a problem that the expected performance and the efficiency of the compressor may be deteriorated.

Further, when the cooling efficiencies of the electric motor driving the compressor as well as the inverter controlling the operation of the electric motor are increased, the temperature of the air inhaled by the compressor is increased. In response to the increased temperature of the inhaled air, the temperature of the air delivered by the compressor is also increased. Consequently, the compressor wheel is overheated and there may be an apprehension that the strength of the compressor wheel is decreased. In addition, the compressor wheel is usually made from, for instance, aluminum, and the decreased strength may cause the breakage of the compressor wheel under the centrifugal forces acting on the compressor wheel.

In view of the difficulties in the conventional technology, the present invention aims at providing an electrically driven turbocharger device which is provided with a cooling device to cool the electric motor or the inverter by use of the intake air delivered by the compressor, wherein the decrease in the flow rate capacity and the performance of the compressor can be constrained, the decrease being attributable to the loss of the intake air flow such as the pressure loss; and the compressor can be prevented from being overheated, and the decrease of the strength or the breakage due to the deterioration can be prevented.

Means to Solve the Subjects

In order to reach the goals as described above, the present invention discloses an electric driven turbocharger device, including, but not limited to:

a power source;

a compressor provided on an intake air flow passage of an engine;

an electric motor driving the compressor; and an inverter transforming electric power from the power source, and supplying the transformed electric power to the electric motor, wherein:

the intake air flow passage being arranged so as to pass by the electric motor and the inverter on the upstream side of the compressor, the electric motor and the inverter being cooled by an intake air flow; and the engine electric driven turbocharger device comprises:

an outside air induction pipe provided with a suction air opening opened toward outside air, the outside air induction pipe being merged with the intake air flow in the intake air flow passage in the neighborhood of a suction opening of the compressor; and an air flow regulating mechanism provided in the outside air induction pipe, wherein:

the outside air is induced from the outside air induction pipe; and the flow rate of the induced air is regulated by the air flow regulating mechanism so as to secure the flow rate of a delivery air—of the compressor as well as constrain the temperature of the delivery air.

According to the invention device as described above, besides the intake air flow passage, the outside air induction pipe is provided so as to be opened toward the outside air as well as induce the outside air toward the compressor. And, when the delivery air flow rate of the compressor is in shortage due to the influence of the loss such as a pressure loss in the intake air flow passage, the outside air is induced from the outside air induction pipe which is hard to be influenced by the pressure loss. In this way, the delivery air flow rate can be increased, and the compressor capacity shortage as well as the compressor performance deterioration can be prevented.

Further, by directly inducing a low temperature outside air from the outside air induction pipe to the compressor, the temperature increase of the compressor inhaling air as well as of the compressor delivery air can be constrained; thus, the strength deterioration of the compressor can be prevented.

A preferable embodiment of the above-described invention is the electric driven turbocharger device, including, but not limited to, a gas-tight housing which houses the compressor, the electric motor and the inverter as well as which comprises an air intake opening, wherein:

an intake air flow passage is formed in the housing, so that the air inhaled from the air intake opening passes by heat generating parts of the electric motor and the inverter and reaches the suction opening of the compressor; and the outside air induction pipe is connected to an enclosing wall of the housing in the neighborhood of the suction opening of the compressor.

As described above, by housing the compressor, the electric motor and the inverter in the gas-tight housing, it becomes easy that the intake air which is used for cooling the electric motor and the inverter is induced to the compressor with the simple configuration. Further, by connecting the outside air induction pipe to the enclosing wall of the housing in the neighborhood of the suction opening of the compressor, the pressure loss of the outside air can be reduced and the outside air can be induced to the compressor with the simple configuration.

Another preferable embodiment of the above-described invention is the electric driven turbocharger device, including, but not limited to:

a delivery air flow rate meter and a delivery air pressure sensor which are provided in the charging air flow passage on the air delivery side of the compressor;

a speed detecting device which detects rotation speed of the compressor; and a controller to which detected values that are detected by the delivery air flow rate meter, the delivery air pressure sensor and the speed detecting device are inputted, and the controller which controls the flow rate of the induced outside air by operating the air flow regulating mechanism based on the detected values.

According to the invention device as described above, in a case where the compressor delivery air flow rate and the compressor air pressure are reduced to lower levels in comparison with the regular levels with respect to the compressor rotation speed due to the influence of the loss such as a pressure loss, the controller adjusts the flow rate of the induced outside air; thus, the controller can regulates the compressor delivery air flow rate and the compressor air pressure to the regular levels. In this way, the shortage in the compressor delivery air flow rate can be constrained.

In the above-described configuration, it is preferable that the parameters such as the compressor delivery air flow rate, the compressor air pressure and the compressor rotation speed are memorized in a form of a map so that the map corresponds to a regular performance map of the compressor. Thus, the performance map and the detected values are compared; and, when the detected values of the compressor delivery air flow rate and the compressor air pressure do not reach the levels according to the compressor performance map, the outside air is preferably induced by manipulating the air flow regulating mechanism.

Another preferable embodiment of the above-described invention is the electric driven turbocharger device, including, but not limited to:

a pressure sensor which detects a suction pressure of the air inhaled into the compressor; and a controller to which the detected value of the delivery air temperature sensor, and the controller which controls the flow rate of the induced outside air by operating the air flow regulating mechanism based on the detected value.

In the above-described configuration, the suction air pressure of the compressor is monitored, and the flow rate of the outside air to be induced is regulated in response to the suction air pressure. In this way, it becomes unnecessary to install the sensor in the delivery air pipe of the compressor. Further, the pressure sensor can be installed in combination with the air flow regulating mechanism of the outside air induction pipe. Accordingly, the installation of the pressure sensor 48 becomes easier. In addition, since only one sensor may be provided, a cost reduction can be achieved.

Another preferable embodiment of the above-described invention is the electric driven turbocharger device, including, but not limited to:

a delivery air temperature sensor which is provided in the intake air flow passage on the air delivery side of the compressor; and a controller to which inputs the detected value of the delivery air temperature sensor, and the controller which controls the flow rate of the induced outside air by operating the air flow regulating mechanism based on the detected value.

According to the invention device as described above, the temperature increase of the compressor delivery air can be constrained, and the damage or the strength deterioration due to overheating of the compressor can be prevented. Further, since only one kind of sensor may be provided, the reliability of measurements can be enhanced and the control can be easily performed. When the configuration in this case is combined with the configuration in the former cases, the capacity shortage and performance deterioration of the compressor as well as the damage or strength deterioration due to overheating of the compressor can be prevented at the same time.

Another preferable embodiment of the above-described invention is the electric driven turbocharger device,
wherein
the air flow regulating mechanism is a pressure regulating valve which includes, but not limited to:

a valve body which opens and closes the air flow passage of the outside air induction pipe;

a spring member which biases elastic force on the valve body toward the closing direction of the valve, and regulates the flow rate of the streaming air of the outside air induction pipe in response to the difference between the air pressure in the outside air induction pipe and the air pressure in the intake airflow passage.

In the above-described configuration, when the flow rate of the intake air inhaled by the compressor is decreased, for instance, due to the pressure loss, the pressure regulating valve is automatically opened so that the replenishment of outside air can be performed; accordingly, the capacity shortage and performance deterioration of the compressor can be constrained. Further, a controller and sensors can be dispensed with, and the pressure regulating valve is configured with only mechanical members. Hence, the configuration can be simplified and the cost can be reduced.

Another preferable embodiment of the above-described invention is the electric driven turbocharger device,
wherein
the outside air induction pipe is connected to the intake air flow passage—at a connection part on the upstream side of the air flow regulating mechanism; and an air filter is installed on the upstream side of the connection part in the outside air induction pipe.

By providing the air filter as described above, the cleanliness of the intake air can be improved; in addition, a malfunction due to inclusion of, for instance, foreign substances can be avoided.

Further, by jointly using the air filter for the intake air passage, the outside air induction pipe and an opening for inhaling the outside air, a space for arranging the air filter or the opening for inhaling the outside air can be reduced. Accordingly, the device can be compact, and the freedom of the layout can be increased.

As described thus far, the present invention provides an electric driven turbocharger device, including, but not limited to:

a power source including, but not limited to, an electricity battery;

a compressor provided in an intake air flow passage of an engine;

an electric motor driving the compressor; and an inverter transforming electric power from the power source, and supplying the transformed electric power to the electric motor,
wherein:

the intake air flow passage being arranged so as to pass by the electric motor and the inverter on the upstream side of the compressor, the electric motor and the inverter being cooled by an intake air flow; and the engine electric driven turbocharger device comprises:

an outside air induction pipe provided with a suction air opening opened toward outside air, the outside air induction pipe being merged with the intake air flow in the intake air flow passage in the neighborhood of a suction opening of the compressor; and an air flow regulating mechanism provided in the outside air induction pipe,
wherein:

the outside air is induced from the outside air induction pipe; and the flow rate of the induced air is regulated by the air flow regulating mechanism so as to secure the flow rate of a delivery air of the compressor as well as constrain the temperature of the delivery air.

With the configuration as described above, the compressor delivery air flow rate can be secured, and the compressor performance deterioration can be prevented. Further, since the low temperature outside air can be induced from the outside air induction pipe toward the compressor, the temperature increase of the compressor delivery air can be constrained and the compressor strength deterioration and damage can be prevented.

DETAILED DESCRIPTION OF THE PREFERRED MODES AND EMBODIMENTS

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

First Mode

Figure 1:
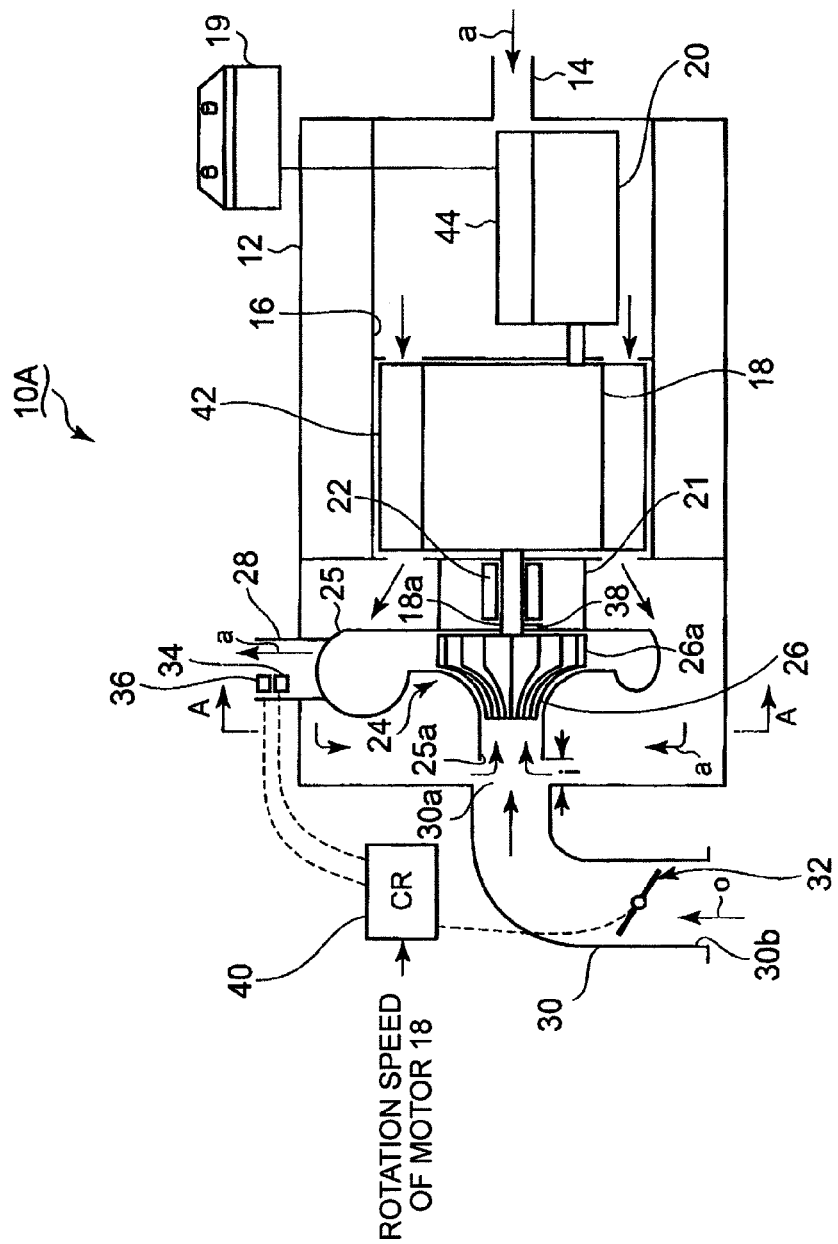
FIG. 1 shows a cross section in an elevation view of the device according to a first mode of the present invention.
Figure 2:
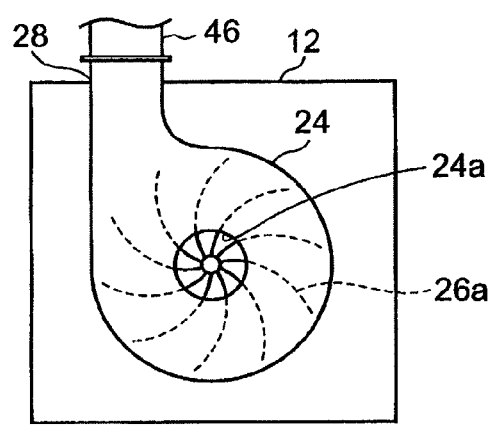
FIG. 2 shows an A-A cross section of FIG. 1.
Figure 3:
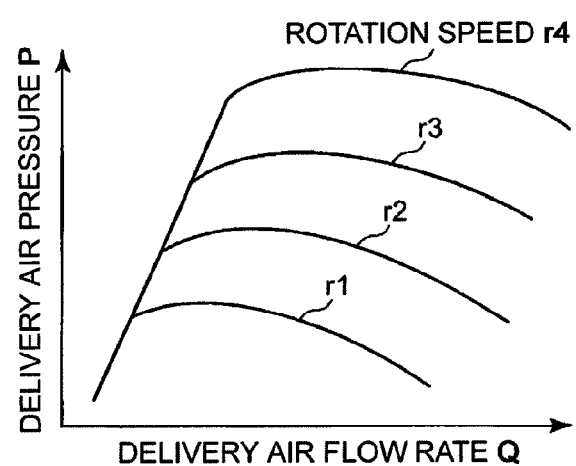
FIG. 3 shows a compressor performance map.

Based on FIGS. 1 to 3, an electrically driven turbocharger device 10A according to the first mode of the present invention is now explained. FIGS. 1 and 2 show the electrically driven turbocharger device 10A which is provided at the intake air flow passage of an engine (not shown) mounted on a vehicle such as an automobile. In FIGS. 1 and 2, an intake air pipe 14 is connected to a side surface of a gas-tight housing 12 of a quadrangle box shape; an intake air flow passage 16 is formed in the gas-tight housing 12. In the intake air flow passage 16, an electric motor rotating the compressor is arranged; further, in the flow passage 16, an inverter 20 controlling the rotation speed of the motor 18 is arranged, the inverter 20 transforming the electric power supplied from a battery provided outside of the gas-tight housing 12 into AC electricity.

A compressor 24 is arranged adjacent to the electric motor 18. A power output shaft 18a of the electric motor 18 penetrates a casing 25 of the compressor 24, and is connected to the rotation shaft of a compressor wheel 26 inside of the casing 25. Further, the power output shaft 18a is rotation-freely supported on a bearing 22 provided inside of a bearing housing 21. The compressor wheel is provided with a plurality of blades 26 radially extended outside from the rotation shaft. At an upper part of the casing 25, a delivery air pipe 28 is arranged so as to penetrate the housing 12; the delivery air pipe 28 is connected to a charging air pipe 46 (as shown in FIG. 2) through which the intake air (a charging air) 'a' is delivered to the engine.

An outside air induction pipe 30 is connected to the opposite side surface of a gas-tight housing 12, the opposite side surface being on the counter side of the side surface to which the intake air pipe 14 is connected. A connection opening 30a of the outside air induction pipe 30 faces a suction opening 25a provided at the casing 25 arranged inside of the housing 12; and, there is a distance 'i' between the connection opening 30a and the suction opening 25a. The electrically driven turbocharger device 10A is arranged usually inside of the engine room of the vehicle whereas another end opening 30b of the outside air induction pipe 30 is opened toward the outside of the engine room. Thus, the outside air of low temperature is inhaled toward the compressor through the outside air induction pipe 30.

Further, a flow rate regulating valve 32 is provided inside of the outside air induction pipe 30. And, a pressure sensor 34 detecting the pressure of the air delivered from the compressor is provided in the delivery air pipe 28; similarly, a flow meter 36 detecting the flow rate of the air delivered from the compressor is provided in the delivery air pipe 28. Further, inside of the bearing housing 21, a speed detecting meter 38 detecting the rotation speed of the power output shaft 18a of the electric motor 18 is provided. The detected values detected by the pressure sensor 34, the flow meter 36 and the speed detecting meter 38 are inputted in a controller 40; based on these detected values, the controller 40 operates the flow rate regulating valve and controls the opening of the outside air induction pipe.

Incidentally, in this mode of the present invention, the speed detecting meter 38 is used; however, in an operation case where the sensor is not used and the electric motor is operated without directly sensing the speed of the motor, the speed of the motor can be estimated:

by detecting the change of the voltage wave form of the motor current as well as the inverter current; or by detecting the difference between the estimation current value and the actual current value. The detected values obtained by another rotation speed detecting means may be used.

On the outer surface of the motor 18, a plurality of cooling fins 42 are provided along the flow direction of the intake air 'a'; thereby, the cross section area of the intake air flow passage 16 formed between cooling fins is made narrow so that: the flow speed of the intake air streaming along the cooling fins is increased; and the cooling effect on the motor 18 is enhanced. Further, on the outer surface of the heat generating part of the inverter 20, a heat sink 44 for heat radiation is provided.

According to the configuration as described above, when the operation of the electric motor 18 is started and the compressor wheel 26 of the compressor 24 which is integrated with the power output shaft 18a into one body is rotated, then the intake air 'a' is inhaled into the inside of the housing 12 from the intake air pipe 14. The intake air 'a' inhaled inside of the housing streams through the intake air flow passage 16 so as to pass by the heat sink 44 radiating the heat; thus, the intake air 'a' cools the inverter 20. In the next place, the intake air 'a' streams through the flow passage between the cooling fins 42 so as to cool the electric motor 18, the cooling fins 42 being provided on the outer surface of the electric motor 18. Subsequently, the intake air 'a' is inhaled inside of the casing 25 from the suction opening 25a; the air inhaled inside of the casing 25 is discharged toward an outer periphery side of the compressor wheel 26 so as to be delivered from the delivery air pipe 28. The intake air 'a' delivered from the delivery air pipe 28 is supplied to the engine via the charging air pipe 46 (as described in FIG. 2).

The relationship between the delivery air pressure P of the air delivered from the compressor 24, the delivery air flow rate Q and the rotation speed 'r' of the compressor wheel 26 is correlated to the compressor performance map as shown in FIG. 3, the compressor performance map showing a regular performance of the compressor 24. This compressor performance map is memorized in the controller 40.

Further, the detected values detected by the pressure sensor 34, the flow meter 36 and the speed detecting meter 38 are inputted into the controller 40. Hence, in a case where the delivery air flow rate and the delivery air pressure do not reach regular levels (positions) in response to the detected speed in the compressor performance map, for instance, due to the pressure loss regarding the intake air flow passage 16, the opening of the flow rate regulating valve in the outside air induction pipe 30 is increased so as to induce the outside air 'o'. Thus, the delivery air flow rate is increased.

As described above, the insufficiency of the capacity as well as the deterioration of the performance regarding the compressor 24 can be eliminated, the insufficiency as well as the deterioration being recognized with respect to the prescribed speed of the compressor. Hence, the compressor capacity insufficiency as well as the compressor performance deterioration can be constrained.

Further, since the compressor 24, the electric motor 18 and the inverter 20 are housed inside of the gas-tight housing 12, the intake air 'a' used for cooling the electric motor 18 and the inverter 20 can be easily induced into the suction opening 25a of the compressor 24. Further, since the connection opening 30a of the outside air induction pipe 30 is arranged at the side surface of the gas-tight housing 12 so as to face the suction opening 25a, the outside air 'o' induced from the outside air induction pipe 30 can be supplied to the suction opening 25a without being significantly influenced by the pressure loss and the like. In addition, since the outside air 'o' of low temperature can be supplied directly toward suction opening 25a, the temperature of the delivery air of the compressor 24 can be constrained.

Second Mode

Figure 4:
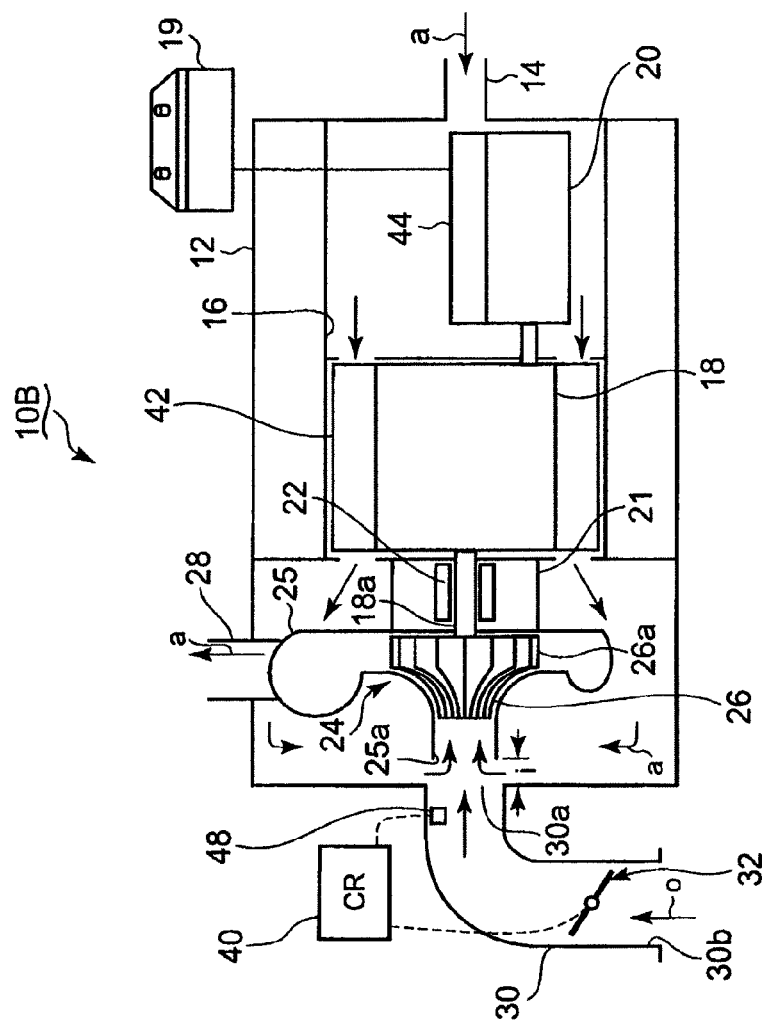
FIG. 4 shows a cross section in an elevation view of the device according to a second mode of the present invention.

In the next place, based on FIG. 4, the second mode of the present invention is now explained. In an electrically driven turbocharger device 10B according to the second mode, instead of the installation of the pressure sensor 34, the flow meter 36 and the speed detecting meter 38, a pressure sensor 48 is provided near the connection opening 30a in the outside air induction pipe 30. The pressure sensor 48 detects the pressure of the air inhaled into the suction opening 25a; the detected value of the air pressure is inputted into the controller 40. In response to the detected value, the controller 40 operates the flow rate regulating valve so as to adjust the opening of the outside air induction pipe 30. Except the points as described here, the configuration of this second mode is the same as that of the first mode.

When the rotation speed of the compressor 24 is kept at a certain speed, the delivery air pressure of the compressor 24 is correlated with the suction pressure of the air inhaled into the compressor 24. Thus, the delivery air pressure can be obtained by measuring the suction air pressure. In this second mode, the suction air pressure of the compressor 24 is monitored by the controller 40 so that the controller regulates the flow rate of the air inhaled from the outside air induction pipe 30 in response to the detected value. For instance, a threshold of the suction air pressure may be set so that the outside air induction pipe 30 is opened when the suction air pressure drops below the threshold.

According to this second mode, when the delivery air pressure of the compressor 24 is reduced, for instance, due to the pressure loss of the intake air flow passage 16, the flow rate of the air inhaled from the outside air induction pipe 30 can be increased so as to compensate the reduction of the flow rate of the air inhaled into the compressor 24. Hence, in the compressor 24, the insufficiency of the capacity as well as the deterioration of the performance can be constrained. Further, the installation of the speed detecting meter as well as the flow meter in the delivery air pipe 28 can be dispensed with.

Further, since the pressure sensor 48 can be installed in combination with the flow rate regulating valve 32 of the outside air induction pipe 30, the pressure sensor 48 can be easily fitted. In addition, since only one sensor may be fitted, the cost reduction can be achieved.

Third Mode

Figure 5:
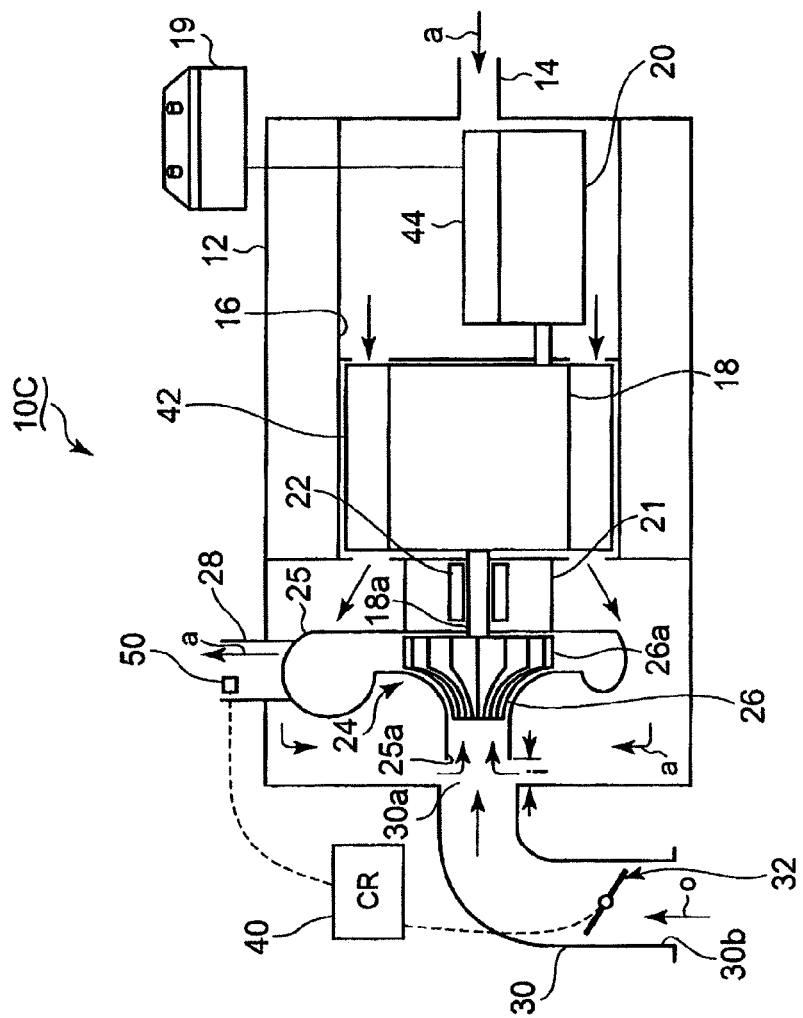
FIG. 5 shows a cross section in an elevation view of the device according to a third mode of the present invention.

In the next place, based on FIG. 5, the third mode of the present invention is now explained. In an electrically driven turbocharger device 100 according to the third mode, instead of the installation of the pressure sensor 34, the flow meter 36 and the speed detecting meter 38 which are provided in the first mode, a temperature sensor 50 is provided so as to detect the temperature of the delivery air. The detected temperature detected by the temperature sensor 50 is inputted into the controller 40. Except the points as described here, the configuration of this third mode is the same as that of the first mode.

The higher the cooling efficiency regarding the intake air 'a' which streams through the intake air flow passage 16 and cools the electric motor 18 and the inverter 20, the higher the temperature of the intake air 'a'. When the intake air 'a' of high temperature is inhaled into the compressor 24, the delivery air is heated-up, and the heated delivery air heats-up the compressor 24. The compressor 24 is usually made, for instance, from aluminum; thus, when the delivery air is overheated, the strength is decreased. Further, under a condition that the strength is reduced, if a large centrifugal force acts on the compressor wheel 26, there may be an apprehension that the breakage of the compressor wheel is caused. According to this third mode, the temperature of the delivery air is detected by the temperature sensor 50; in addition, the opening of the outside air induction pipe 30 is regulated so that the temperature of the delivery air does not exceed a threshold temperature. In other words, the outside air 'o' is induced from the outside air induction pipe 30, so that the temperature of the delivery air does not exceed the threshold temperature.

As described above, the excessive increase of the temperature of the delivery air can be prevented; and, the decrease of the strength or the damage of the compressor wheel 26 due to the overheating of the compressor 24 can be prevented. Further, since only one kind of sensor is provided, it becomes unnecessary to perform control by memorizing the map data in the controller 40, different from the first mode. Thus, the control is simplified and easily performed. And, the reliability of the measurement can be enhanced.

Incidentally, when this third mode is performed together with the first mode or the second mode, the capacity shortage and performance deterioration of the compressor 24 as well as the damage or strength deterioration due to overheating of the compressor 24 can be prevented at the same time.

Fourth Mode

Figure 6:
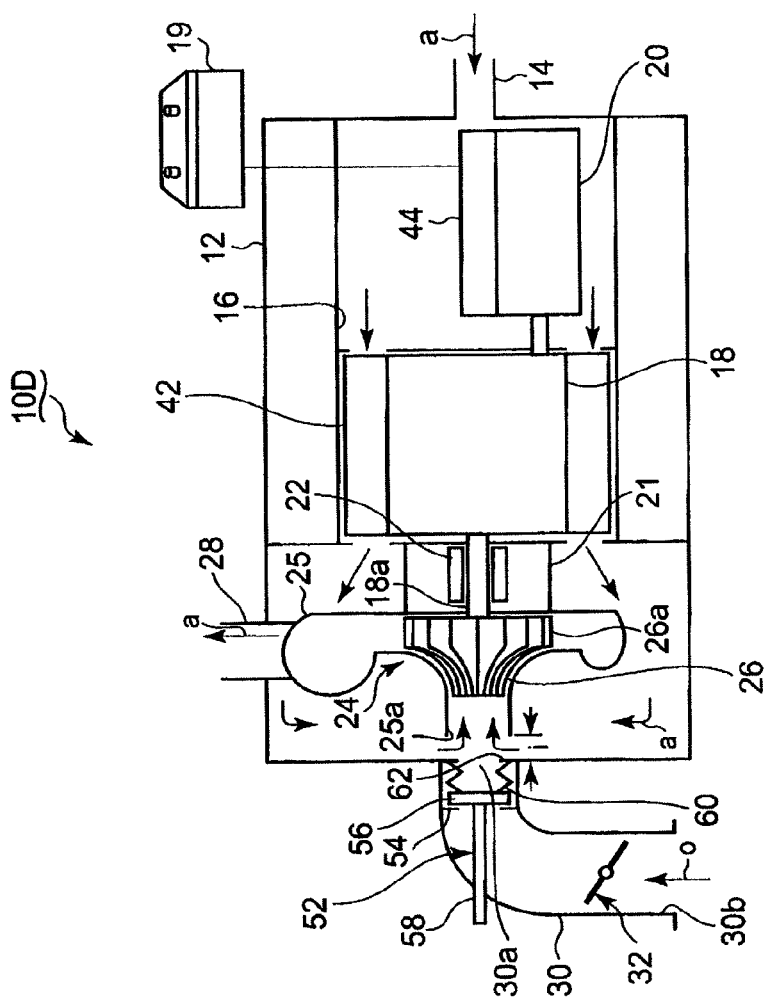
FIG. 6 shows a cross section in an elevation view of the device according to a fourth mode of the present invention.

In the next place, based on FIG. 6, the fourth mode of the present invention is now explained. In an electrically driven turbocharger device 10D according to the fourth mode, different from the first, second and third modes, the sensors or the controller 40 are not provided. Instead, a pressure regulating valve 52 is provided in the outside air induction pipe 30. The pressure regulating valve 52 includes, but not limited to:

a valve seat 54 provided on the inner side surface of the outside air induction pipe 30; and a coil spring 60 set between a valve body 56 integrated with a valve stem 58 and a support frame 62 provided at the connection opening 30a.

The valve body 56 is arranged movably along the axis direction of the valve stem 58. Except the points as described, the configuration of this fourth mode is the same as that of the first mode.

The valve body 56 is normally positioned so as to close the outside air induction pipe 30 by use of the elastic force of the coil spring. However, when the suction air pressure of the compressor 24 drops below a threshold, the difference between the air pressure inside of the outside air induction pipe 30 and the suction air pressure at the inlet side of the compressor exceeds the elastic force of the compressor 24. And, the valve body 56 moves toward the compressor 24, and the pressure regulating valve 52 is opened.

Hence, the outside air 'o' is replenished to the suction opening 25*a* of the compressor 24 from the outside air induction pipe 30. Thus, the insufficiency of the delivery air as well as the deterioration of the performance regarding the compressor 24 can be constrained. Further, according to the present mode, the controller and the sensors can be dispensed with. Thus, the pressure regulating valve 52 is configured only with mechanical members. Accordingly, the configuration can be simplified, the cost reduction can be achieved, and the reliability can be enhanced.

Fifth Mode

Figure 7:
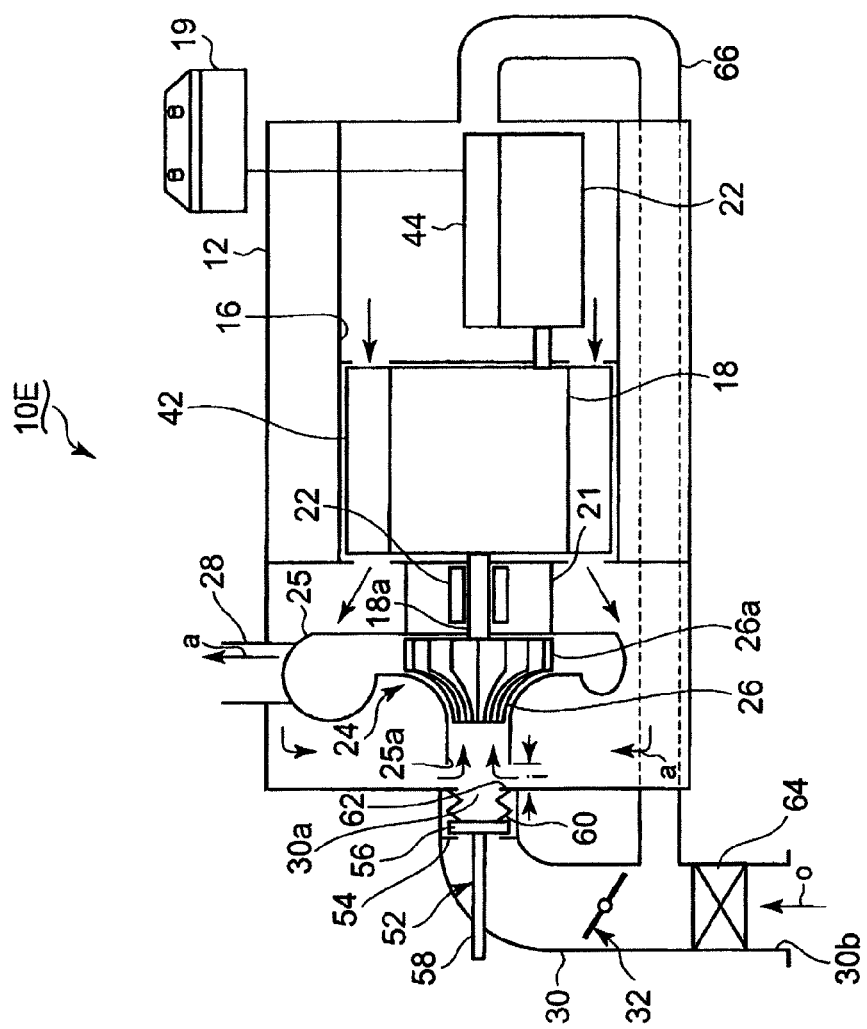
FIG. 7 shows a cross section in an elevation view of the device according to a fifth mode of the present invention.
Figure 8:
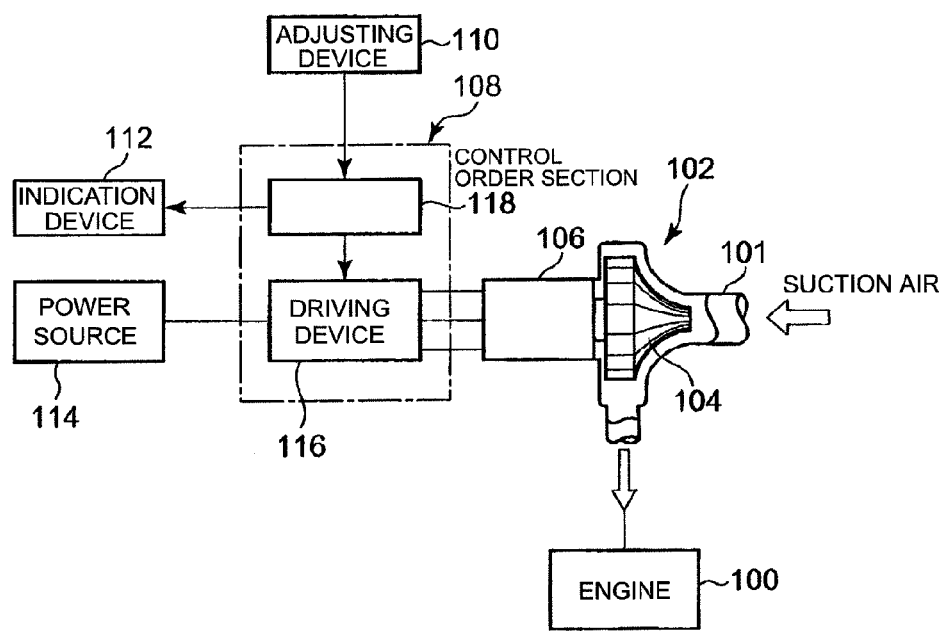
FIG. 8 shows a block diagram of a conventional electrically driven turbocharger device; and, FIG. 9 shows the configuration of the air flow passages of an engine into which a conventional electrically driven turbocharger device is installed.
Figure 9:
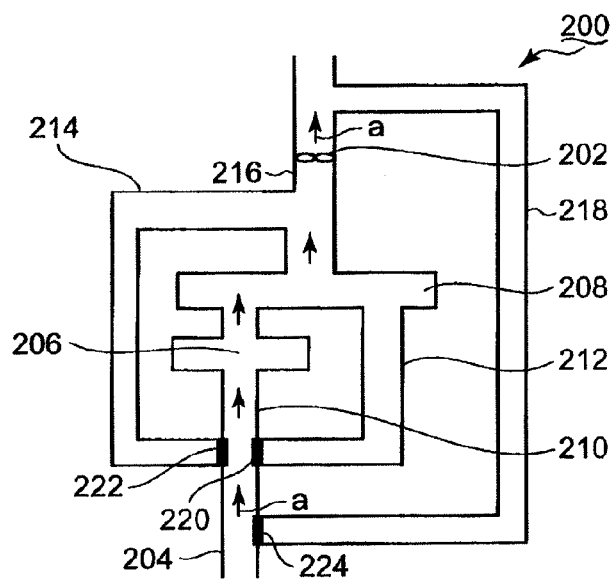

In the next place, based on FIG. 7, the fifth mode of the present invention is now explained. In an electrically driven turbocharger device 10E according to the fifth mode, a pressure regulating valve 52 is provided in the outside air induction pipe 30, the configuration of the pressure regulating valve 52 being the same as the configuration in the fourth mode. In addition, an air filter 64 is provided at the inlet part of the outside air induction pipe 30. Further, on the downstream side of the air filter 64, an air intake pipe 66 diverges from the outside air induction pipe 30. The diverged air-intake-pipe 66 is connected to an enclosing wall on the inverter 22 side of the gas-tight housing 12. Except the points as described, the configuration of this fifth mode is the same as that of the fourth mode.

According to the configuration as described above, the end opening 30*b* of the outside air induction pipe 30 is opened toward the outside air. Thus, the outside air 'o' of low temperature can be taken in. The outside air 'o' of low temperature can be supplied to not only the outside air induction pipe 30 but also the air intake pipe 66. Accordingly, the cooling effect for the compressor 24 can be enhanced. Further, the cleanliness of the outside air 'o' can be improved, and a malfunction due to inclusion of, for instance, foreign substances can be avoided.

Further, a space for arranging the air filter or an opening for inhaling the outside air can be reduced. Accordingly, the device can be compact, and the freedom of the layout can be increased.

INDUSTRIAL APPLICABILITY

According to the present invention, in the electric driven turbocharger device provided in the intake air passage in the internal combustion engine, the compressor capacity shortage and performance deterioration due to the shortage of the compressor inhaling air flow rate can be constrained. Further, the compressor temperature increase caused by inhaling an overheated air which is heated-up by cooling the electric motor and the inverter can be constrained. And, the reliability of the compressor can be enhanced.

The invention claimed is:

1. An electric driven turbocharger device, comprising:
   a power source;
   a compressor provided in an intake air flow passage of an engine, the compressor comprising a compressor wheel for compressing an air and a casing having a suction opening for inhaling an intake air supplied to the compressor wheel;
   an electric motor configured to drive the compressor;
   an inverter configured to transform electric power from the power source and supply the transformed electric power to the electric motor;
   a housing configured to house the compressor, the electric motor, and the inverter, the housing having an intake air pipe connected to a first side surface of the housing forming an intake air flow passage so that intake air inhaled from the intake air pipe passes through the inverter and heat generating parts of the electric motor and reaches the suction opening of the casing;
   an outside air induction pipe having a connection opening at an end and a suction air opening opened toward outside air at another end, the connection opening end of the outside air induction pipe being connect to a second side surface of the housing opposite the first side surface; and
   an air flow regulating mechanism provided in the outside air induction pipe, wherein the compressor is housed in the housing so that the suction opening of the casing faces the connection opening of the outside air induction pipe at a predetermined distance;
   the suction opening of the casing is configured to inhale outside air induced from the outside air induction pipe and the intake air inhaled from the intake air pipe; and
   the intake air inhaled from the intake air pipe is configured to flow in the intake air flow passage of the housing, pass through the predetermined distance between the connection opening of the outside air induction pipe and the suction opening of the casing and be inhaled to the suction opening of the casing.

2. The electric driven turbocharger device according to claim 1, comprising:
   a delivery air flow rate meter and a delivery air pressure sensor which are provided in the charging air flow passage on an air delivery side of the compressor;
   a speed detecting device configured to detect rotation speed of the compressor; and
   a controller to which detected values detected by the delivery air flow rate meter, the delivery air pressure sensor and the speed detecting device are inputted, the controller operating the air flow regulating mechanism based on the detected values so as to control flow rate of an induced outside air.

3. The electric driven turbocharger device according to claim 1, comprising:
   a pressure sensor configured to detect a suction pressure of an air inhaled into the compressor; and
   a controller to which a detected value of the pressure sensor is inputted, the controller operating the air flow regulating mechanism based on the detected value so as to control flow rate of the induced outside air.

4. The electric driven turbocharger device according to claim 1, comprising:
   a delivery air temperature sensor provided in the intake air flow passage on the air delivery side of the compressor; and
   a controller to which a detected value of the delivery air temperature sensor is inputted, the controller operating the air flow regulating mechanism based on the detected value so as to control flow rate of the induced outside air.

5. The electric driven turbocharger device according to claim 1, wherein the air flow regulating mechanism is a pressure regulating valve which comprises:
   a valve body configured to open and close an air flow passage of the outside air induction pipe; and
   a spring member configured to bias elastic force on the valve body toward the closing direction of the pressure regulating valve, and regulate a flow rate of streaming air of the outside air induction pipe in response to a difference between air pressure in the outside air induction pipe and air pressure in the intake air flow passage.

6. The electric driven turbocharger device according to claim 1, wherein
   the intake air pipe is configured to diverge from the outside air induction pipe at a branch point on the upstream side of the air flow regulating mechanism; and
   an air filter is installed in the outside air induction pipe on an upstream side of the branch point connection part in the outside air induction pipe.

7. The electric driven turbocharger device according to claim 2, comprising:
   a delivery air temperature sensor provided in the intake air flow passage on the air delivery side of the compressor; and
   a controller to which a detected value of the delivery air temperature sensor is inputted, the controller operating the air flow regulating mechanism based on the detected value so as to control flow rate of the induced outside air.

8. The electric driven turbocharger device according to claim 3, comprising:
   a delivery air temperature sensor provided in the intake air flow passage on the air delivery side of the compressor; and
   a controller to which a detected value of the delivery air temperature sensor is inputted, the controller operating the air flow regulating mechanism based on the detected value so as to control flow rate of the induced outside air.

9. The electric driven turbocharger device according to claim 2, wherein
   the outside air induction pipe is connected to the intake air flow passage at a connection part on the upstream side of the air flow regulating mechanism; and
   an air filter is installed on the upstream side of the connection part in the outside air induction pipe.

10. The electric driven turbocharger device according to claim 3, wherein
    the outside air induction pipe is connected to the intake air flow passage at a connection part on the upstream side of the air flow regulating mechanism; and
    an air filter is installed on the upstream side of the connection part in the outside air induction pipe.

11. The electric driven turbocharger device according to claim 4, wherein
    the outside air induction pipe is connected to the intake air flow passage at a connection part on the upstream side of the air flow regulating mechanism; and
    an air filter is installed on the upstream side of the connection part in the outside air induction pipe.

12. The electric driven turbocharger device according to claim 5, wherein
    the outside air induction pipe is connected to the intake air flow passage at a connection part on the upstream side of the air flow regulating mechanism; and
    an air filter is installed on the upstream side of the connection part in the outside air induction pipe.

* * * * *